US012739504B2

(12) United States Patent
Morita

(10) Patent No.: US 12,739,504 B2
(45) Date of Patent: Sep. 15, 2026

(54) IN-VEHICLE APPARATUS

(71) Applicant: TOYOTA JIDOSHA KABUSHIKI KAISHA, Toyota (JP)

(72) Inventor: Naoya Morita, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/042,208

(22) Filed: Jan. 31, 2025

(65) Prior Publication Data

US 2026/0012702 A1 Jan. 8, 2026

(30) Foreign Application Priority Data

Jul. 5, 2024 (JP) ................................ 2024-109058

(51) Int. Cl.
*H04N 23/661* (2023.01)
*H04N 7/18* (2006.01)

(52) U.S. Cl.
CPC ........... *H04N 23/661* (2023.01); *H04N 7/185* (2013.01)

(58) Field of Classification Search
CPC ............................ H04N 23/661; H04N 7/185
See application file for complete search history.

(56) References Cited

U.S. PATENT DOCUMENTS

| | | | | |
|---|---|---|---|---|
| 9,083,581 | B1 * | 7/2015 | Addepalli | B60W 50/10 |
| 11,233,836 | B2 * | 1/2022 | Fornshell | H04W 76/14 |
| 2011/0173338 | A1 * | 7/2011 | Chiu | G06F 9/546 709/229 |
| 2012/0028680 | A1 * | 2/2012 | Breed | G01S 15/42 455/556.1 |
| 2024/0157958 | A1 * | 5/2024 | Shi | B60W 40/02 |

FOREIGN PATENT DOCUMENTS

JP 2021-051665 A 4/2021

* cited by examiner

*Primary Examiner* — Jae N Noh
(74) *Attorney, Agent, or Firm* — SoraIP, Inc.

(57) ABSTRACT

The in-vehicle apparatus includes a storage unit that stores terminal device information for using a terminal device included in a mobile communication terminal communicably connected to the in-vehicle apparatus, and an in-vehicle device manager that transmits, to the mobile communication terminal, a terminal device use request that is a request to use the terminal device based on the terminal device information stored in the storage unit. In the in-vehicle apparatus, when a terminal device use request is transmitted from the in-vehicle device manager to the mobile communication terminal, data is acquired by the terminal device, and the data is input to the in-vehicle apparatus from the mobile communication terminal.

4 Claims, 4 Drawing Sheets

10
1
IN-VEHICLE ECU
11
STORAGE UNIT
5
TERMINAL DEVICE INFORMATION
12
IN-VEHICLE DEVICE MANAGER
13
App
13
App
13
App
IN-VEHICLE APPARATUS
30
3
TERMINAL ECU
31
DEVICE MANAGER FOR THE TERMINAL
32
App
32
App
32
App
DEVICE GROUP
41a, 41
CAMERA
41c, 41
DISPLAY
41
STORAGE
41
Bluetooth
41
Wi-Fi
41b, 41
USB CONNECTOR
41
Ethernet
MOBILE HANDSETS
40

12
IN-VEHICLE DEVICE MANAGER
X
PSEUDO DEVICE NAME
DEVICE NAME
31
DEVICE MANAGER FOR THE TERMINAL
DEVICE NAME: CAMERA, id = 0
DEVICE NAME: CAMERA, id = 1
DEVICE NAME: DISPLAY

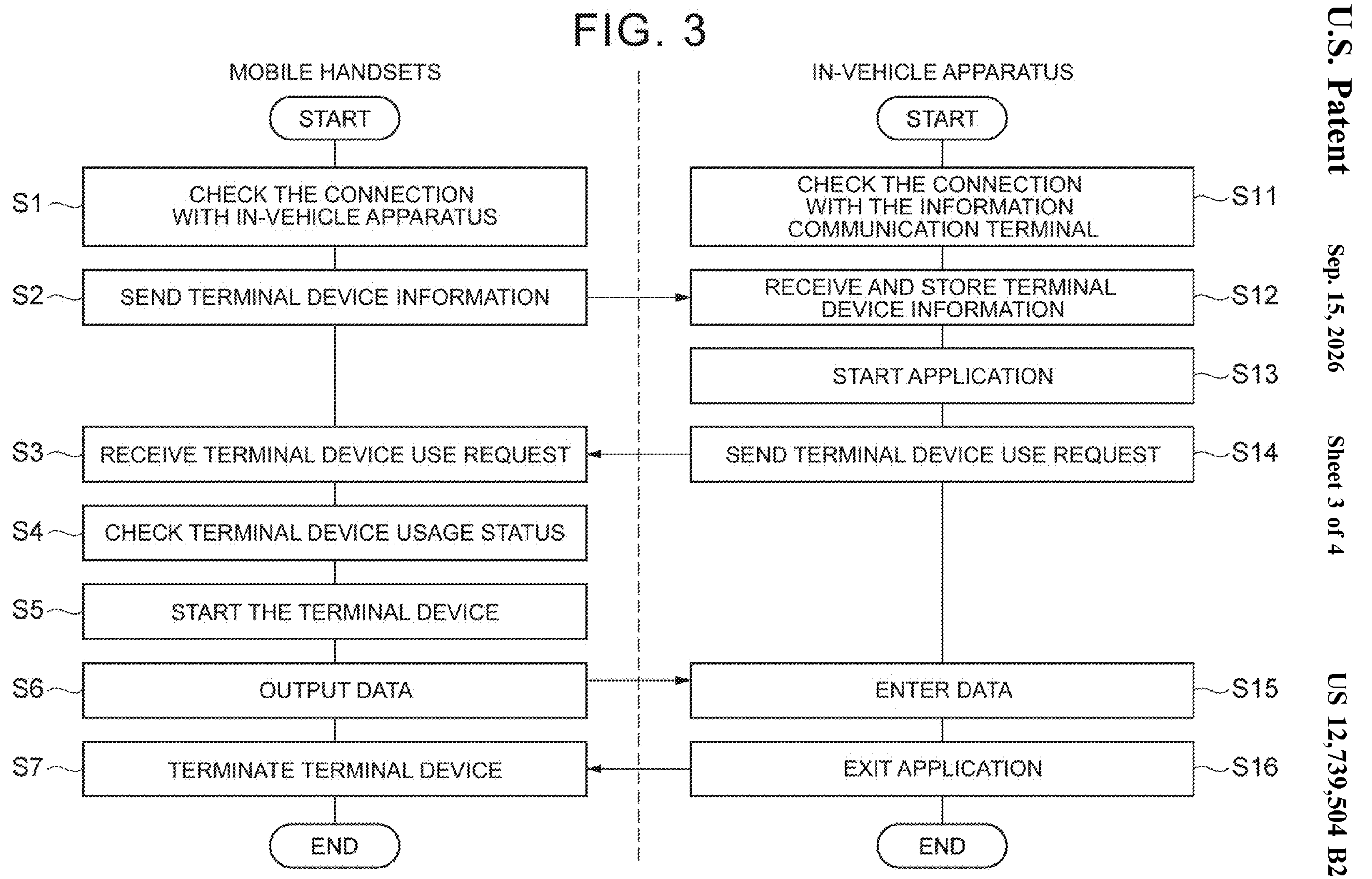
FIG. 3
MOBILE HANDSETS
START
S1
CHECK THE CONNECTION WITH IN-VEHICLE APPARATUS
S2
SEND TERMINAL DEVICE INFORMATION
S3
RECEIVE TERMINAL DEVICE USE REQUEST
S4
CHECK TERMINAL DEVICE USAGE STATUS
S5
START THE TERMINAL DEVICE
S6
OUTPUT DATA
S7
TERMINATE TERMINAL DEVICE
END
IN-VEHICLE APPARATUS
START
S11
CHECK THE CONNECTION WITH THE INFORMATION COMMUNICATION TERMINAL
S12
RECEIVE AND STORE TERMINAL DEVICE INFORMATION
S13
START APPLICATION
S14
SEND TERMINAL DEVICE USE REQUEST
S15
ENTER DATA
S16
EXIT APPLICATION
END

IN-VEHICLE APPARATUS

CROSS-REFERENCE TO RELATED APPLICATION

This application claims priority to Japanese Patent Application No. 2024-109058 filed on Jul. 5, 2024, incorporated herein by reference in its entirety.

BACKGROUND

1. Technical Field

One aspect of the present disclosure relates to an in-vehicle apparatus.

2. Description of Related Art

For example, an in-vehicle information processing system described in Japanese Unexamined Patent Application Publication No. 2021-051665 (JP 2021-051665 A) is known as a technology related to an in-vehicle apparatus. In the in-vehicle information processing system described in JP 2021-051665 A, in order to effectively use the resource of a mobile communication terminal, the in-vehicle apparatus monitors the availability of the resource of the mobile communication terminal and requests the mobile communication terminal to process a task for processing in-vehicle information.

SUMMARY

In the above technology, the in-vehicle apparatus needs to have, for example, driver information for use of the device of the terminal, and the resource of the in-vehicle apparatus may be insufficient.

In view of the above, an object of one aspect of the present disclosure is to provide an in-vehicle apparatus capable of preventing insufficiency of a resource.

An in-vehicle apparatus according to one aspect of the present disclosure is an in-vehicle apparatus to be mounted on a vehicle. The in-vehicle apparatus includes:

a storage unit configured to store terminal device information for use of a terminal device that is a device of a terminal that establishes communicative connection to the in-vehicle apparatus; and an in-vehicle device management unit configured to transmit a terminal device use request that is a request to use the terminal device to the terminal based on the terminal device information stored in the storage unit.

When the terminal device use request is transmitted from the in-vehicle device management unit to the terminal, data is acquired by the terminal device and is input from the terminal to the in-vehicle apparatus.

The in-vehicle apparatus according to the one aspect of the present disclosure may further include a drive recorder execution unit configured to execute a drive recorder function of the vehicle.

The terminal device information may include information for use of a camera of the terminal.

When a request to use the device is given from the drive recorder execution unit to the in-vehicle device management unit, a camera use request that is the terminal device use request to use the camera of the terminal may be transmitted from the in-vehicle device management unit to the terminal based on the terminal device information.

When the camera use request is transmitted from the in-vehicle device management unit to the terminal, the camera may be activated to acquire video data and the video data may be input from the terminal to the drive recorder execution unit.

According to the one aspect of the present disclosure, it is possible to provide the in-vehicle apparatus capable of preventing the insufficiency of the resource.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flow chart illustrating an exemplary process performed by the in-vehicle apparatus and the mobile communication terminal of FIG. 1.

DETAILED DESCRIPTION OF EMBODIMENTS

Figure 1:
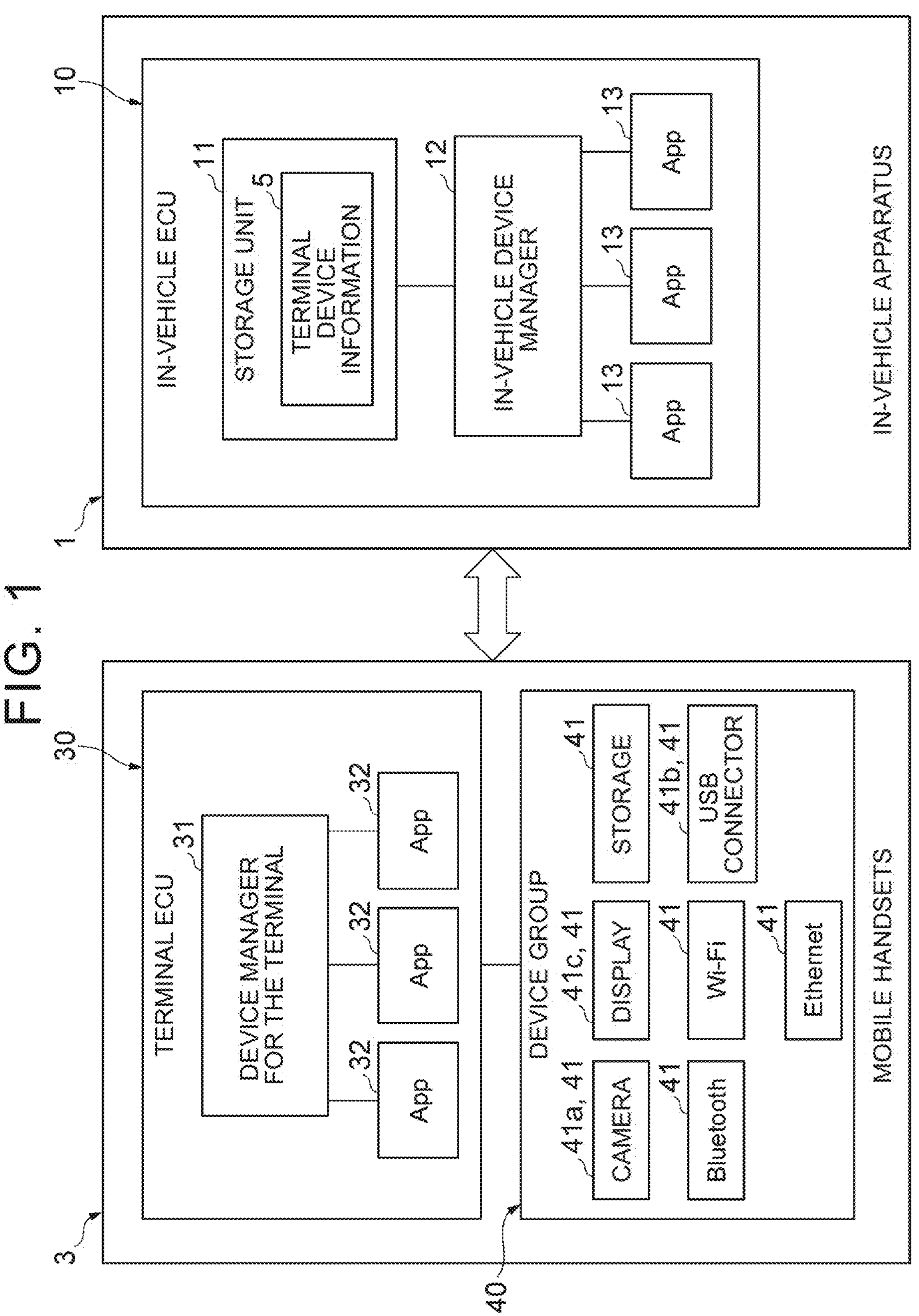
FIG. 1 is a block diagram illustrating a configuration of an in-vehicle apparatus and a mobile communication terminal according to an embodiment.

Hereinafter, embodiments will be described in detail with reference to the accompanying drawings. In the description of the drawings, the same or corresponding elements are denoted by the same reference numerals, and redundant description will be omitted.

As illustrated in FIG. 1, the in-vehicle apparatus 1 according to the embodiment is a device mounted on a vehicle. The vehicle is not particularly limited, and may be a passenger car or a freight car. The in-vehicle apparatus 1 is communicably connected to a mobile communication terminal 3. The mobile communication terminal 3 is not particularly limited, and may be, for example, a smartphone or a tablet. The in-vehicle apparatus 1 may be connectable to a plurality of mobile communication terminals 3.

The in-vehicle apparatus 1 includes an in-vehicle ECU [Electronic Control Unit] 10. The in-vehicle ECU 10 is an electronic control unit having CPU (Central Processing Unit), ROM (Read Only Memory), RAM (Random Access Memory), and the like. In the in-vehicle ECU 10, for example, various functions are realized by loading a program stored in a ROM into a RAM and executing the program loaded in RAM by a CPU. Some of the functions of the in-vehicle ECU 10 may be performed in servers capable of communicating with vehicles. The in-vehicle ECU 10 may include a plurality of electronic units. Various devices such as an in-vehicle display and an in-vehicle camera may be mounted on the in-vehicle apparatus 1.

The in-vehicle ECU 10 includes a storage unit 11 that stores terminal device information 5, an in-vehicle device manager (in-vehicle device management unit) 12, and a plurality of applications 13. The terminal device information 5 is information for using the terminal device 41 which is a device of the mobile communication terminal 3. The terminal device information 5 includes at least one of a type and/or a name of the terminal device 41, a number of the terminal devices 41, and a usage status of the terminal device 41. Here, the terminal device information 5 includes the type and/or name of the terminal device 41 and the number of the terminal devices 41.

The terminal device information 5 is transmitted from the mobile communication terminal 3 and stored in the storage unit 11 when the in-vehicle apparatus 1 and the mobile communication terminal 3 are communicably connected to each other or when the mobile communication terminal 3 communicably connected to the in-vehicle apparatus 1 is powered ON. The stored terminal device information 5 is deleted from the storage unit 11 when the connection between the in-vehicle apparatus 1 and the mobile communication terminal 3 that are communicably connected is released, or when the mobile communication terminal 3 that is communicably connected to the in-vehicle apparatus 1 is powered OFF. Whether or not the in-vehicle apparatus 1 and the mobile communication terminal 3 are communicably connected, whether or not the connection is released, whether or not the mobile communication terminal 3 communicably connected to the in-vehicle apparatus 1 is powered ON, and whether or not the mobile communication terminal 3 has been powered OFF can be determined using various known techniques and known techniques.

Figure 2:
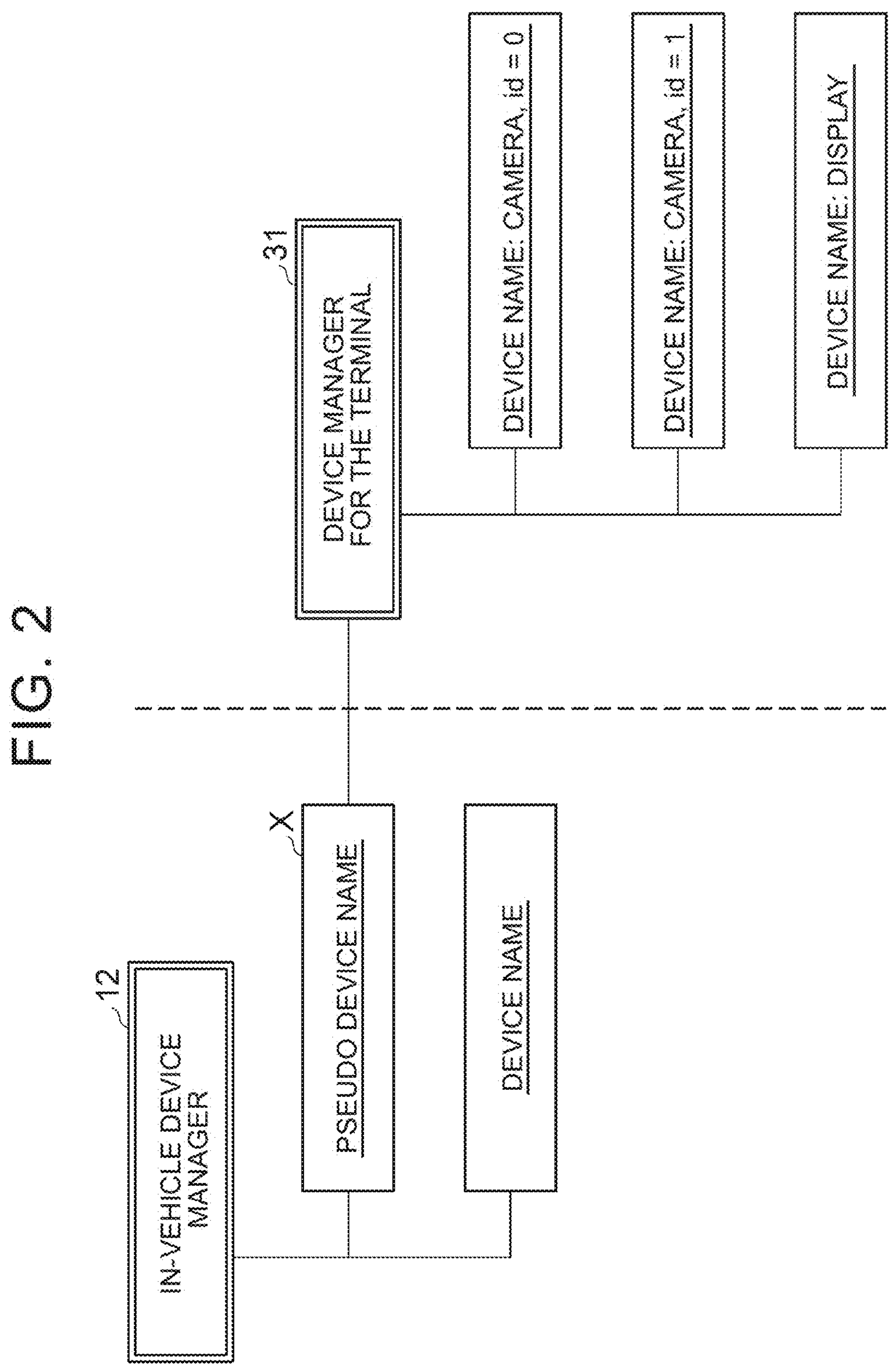
FIG. 2 is a diagram illustrating a data structure of the terminal device information of FIG. 1.

The in-vehicle device manager 12 manages each device in the data structure of the device tree shown in FIG. 2 based on the terminal device information 5 stored in the storage unit 11. The in-vehicle device manager 12 manages the terminal device 41 as a device held by the in-vehicle apparatus 1 in a pseudo manner based on the terminal device information 5.

As illustrated in FIG. 1, the application 13 is a functional element for executing various functions of the vehicle, and is, for example, software designed for the purpose of performing specific processing. One of the plurality of applications 13 constitutes a drive recorder execution unit that executes a drive recorder function of the vehicle. The drive recorder function is a function of recording at least an image of the surroundings of the vehicle during driving, stopping, and parking.

In the example of FIG. 2, the terminal device information 5 includes information of "device name: camera, number: 2 units (id=1 and id=2)", and "device name: display, number: 1 unit". In this case, the in-vehicle apparatus 1 may be provided with control software for only a connecting device (for example, a USB connector) that connects the mobile communication terminal 3. Since the pseudo device X has the tree structure information of the terminal device manager 31, which will be described later, the application 13 only needs to specify the device name and id of the mobile communication terminal 3, and it is not required to be conscious of the connected device. In the example of FIG. 2, the terminal device information 5 includes information on the name of the terminal device 41, but may alternatively or additionally include information on the type of the terminal device 41.

As illustrated in FIG. 1, the mobile communication terminal 3 includes a terminal ECU 30 and a plurality of terminal devices 41. The terminal ECU 30 is an electronic control unit having a CPU, ROM, RAM or the like. In the terminal ECU 30, for example, various functions are realized by loading a program stored in a ROM into a RAM and executing the program loaded in RAM by a CPU. Some of the functions of the terminal ECU 30 may be performed in servers capable of communicating with vehicles. The terminal ECU 30 may include a plurality of electronic units. The terminal ECU 30 includes a terminal device manager 31 and a plurality of applications 32.

The terminal device manager 31 manages the terminal device 41 in the data structure of the device tree. The terminal device manager 31 transmits the terminal device information 5 to the in-vehicle apparatus 1. Specifically, the terminal device manager 31 transmits the terminal device information 5 to the in-vehicle apparatus 1 when the in-vehicle apparatus 1 and the mobile communication terminal 3 are communicably connected to each other or when the mobile communication terminal 3 communicably connected to the in-vehicle apparatus 1 is powered ON.

The application 32 is a functional element for executing various functions of the mobile communication terminal 3, and is, for example, software designed for the purpose of performing specific processing. For example, the application 32 constitutes a camera control unit that controls the operation of the camera.

The terminal device 41 is a device mounted on the mobile communication terminal 3. The terminal device 41 includes, for example, a camera, a display, a storage, a Bluetooth, a Wi-Fi, USB connector, and the Ethernet. The plurality of terminal devices 41 constitute a device group 40.

In the present embodiment, when there is a request for use of a device from the application 13, the in-vehicle device manager 12 transmits, to the terminal device manager 31 of the mobile communication terminal 3, a terminal device use request that is a request to use the terminal device 41 based on the terminal device information 5. When receiving the terminal device use request from the in-vehicle device manager 12, the terminal device manager 31 activates the terminal device 41 that is the target of the terminal device use request. Here, when the terminal device use request is received, the terminal device manager 31 confirms the use status of the terminal device 41, and when the terminal device 41 is not currently in use by the application 32, activates the terminal device 41.

The terminal device manager 31 transmits the data acquired by the activated terminal device 41 to the application 13 of the in-vehicle apparatus 1 that is a request source of the terminal device use request. That is, when a terminal device use request is transmitted from the in-vehicle device manager 12 to the mobile communication terminal 3, data is acquired by the terminal device 41, and the data is input from the mobile communication terminal 3 to the in-vehicle apparatus 1. The in-vehicle device manager 12 outputs the end of the application 13 to the terminal device manager 31. When the termination of the application 13 is input, the terminal device manager 31 terminates the activated terminal device 41.

Next, an example of processing performed by the in-vehicle apparatus 1 and the mobile communication terminal 3 will be described by way of example with reference to a flowchart illustrated in FIG. 3.

In the exemplary embodiment illustrated in FIG. 3, in the mobile communication terminal 3, when the connection with the in-vehicle apparatus 1 is confirmed, the terminal device information 5 is transmitted from the terminal device manager 31 to the in-vehicle apparatus 1 (S1, S2). In the in-vehicle apparatus 1, when the connection with the mobile communication terminal 3 is confirmed, the terminal device information 5 transmitted by S2 is received, and the terminal device information 5 is stored (added) in the storage unit 11 (S11, S12). The terminal device information 5 is stored at this timing, and is not deleted unless the connection between the in-vehicle apparatus 1 and the mobile communication terminal 3 is released or there is an external request.

In the in-vehicle apparatus 1, the application 13 is activated (S13). In the in-vehicle apparatus 1, a request for use of a device from the application 13 is input to the in-vehicle device manager 12. In response, the in-vehicle device manager 12 transmits a terminal device use request to the terminal device manager 31 of the mobile communication terminal 3 (S14).

In the mobile communication terminal 3, the terminal device use request is received, and the terminal device manager 31 confirms the use status of the terminal device 41 that is the target of the terminal device use request (S3, S4). When the terminal device 41 is not currently in use, the terminal device 41 is activated by the terminal device manager 31 to obtain data (S5). The data acquired by the terminal device 41 is outputted to the in-vehicle apparatus 1 (S6). In the in-vehicle apparatus 1, data acquired and outputted by the terminal device 41 is inputted to the application 13 (S15). Thereafter, when the application 13 is terminated in the in-vehicle apparatus 1, the terminal device 41 of the mobile communication terminal 3 is also terminated (S16, S7)

Next, an example in which the in-vehicle apparatus 1 executes the drive recorder function of the vehicle using the mobile communication terminal 3 will be described with reference to the processing flow illustrated in FIG. 4.

Figure 4:
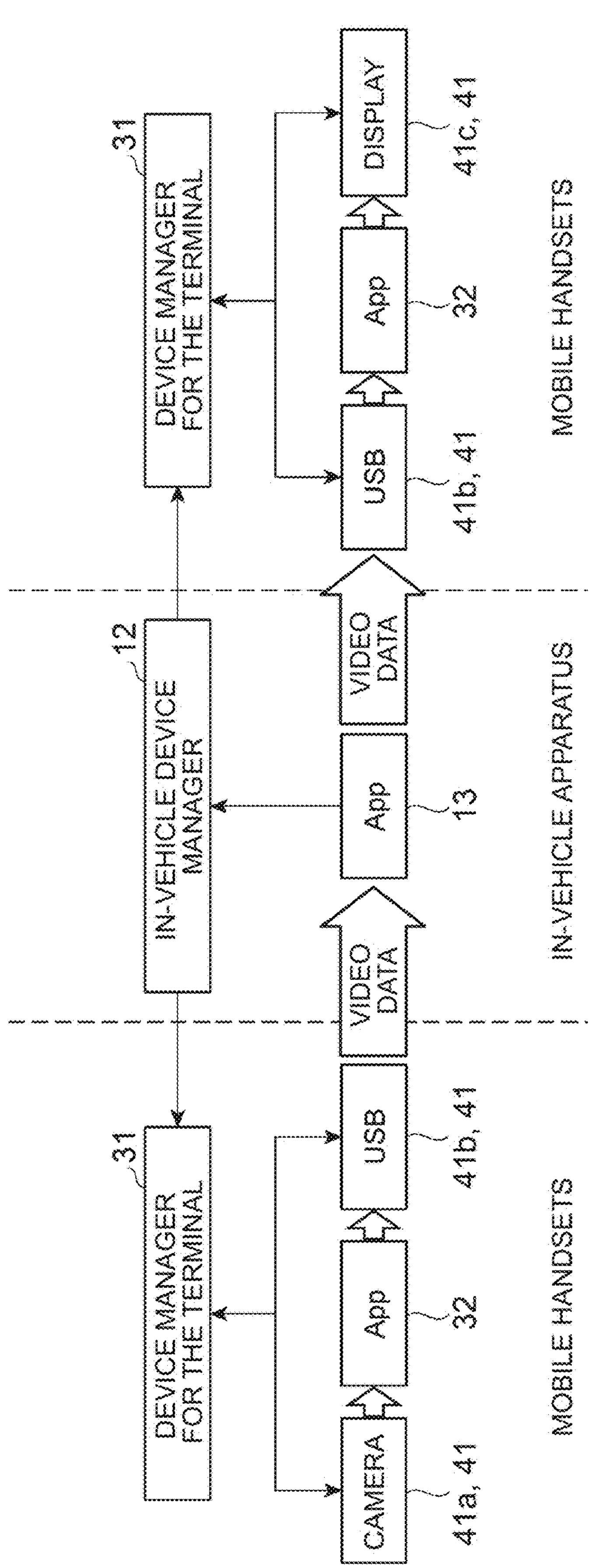
FIG. 4 is a process flow diagram illustrating an example of a case where the in-vehicle apparatus of FIG. 1 executes a drive recorder function of a vehicle using a mobile communication terminal.

In the exemplary embodiment shown in FIG. 4, the terminal device information 5 includes information for using the camera 41*a*, USB connector 41*b* and the display 41*c*. In the in-vehicle apparatus 1, a request for using the camera 41*a* of the mobile communication terminal 3 is made to the in-vehicle device manager 12 from the application 13 constituting the drive recorder execution unit. Consequently, the in-vehicle device manager 12 transmits a camera use request, which is a terminal device use request using the camera 41*a*, from the in-vehicle device manager 12 to the terminal device manager 31. The usage status of the camera 41*a* and USB connector 41*b* is inputted to the terminal device manager 31. The camera 41*a* is activated and video is acquired by the application 32 when the camera 41*a* and USB connector 41*b* are not currently in use. The acquired video data is inputted to the application 13 of the in-vehicle apparatus 1 via USB connector 41*b*.

In addition, in the in-vehicle apparatus 1, a request for using the display 41*c* of the mobile communication terminal 3 is made to the in-vehicle device manager 12 from the application 13 to which the video data is inputted. In this case, the in-vehicle device manager 12 transmits a display use request, which is a terminal device use request using the display 41*c*, from the in-vehicle device manager 12 to the terminal device manager 31. The usage status of USB connector 41*b* and the display 41*c* is inputted to the terminal device manager 31. Video data is inputted from the application 13 to the application 32 of the mobile communication terminal 3 via USB connector 41*b* when USB connector 41*b* and the display 41*c* are not currently in use. The image data is inputted from the application 32 to the display 41*c* and displayed on the display 41*c*.

As described above, the in-vehicle apparatus 1 includes the storage unit 11 that stores the terminal device information 5, and the in-vehicle device manager 12 that transmits the terminal device use request to the mobile communication terminal 3 based on the terminal device information 5. When a terminal device use request is transmitted from the in-vehicle device manager 12 to the mobile communication terminal 3, data is acquired by the terminal device 41, and the data is input from the terminal device 41 to the in-vehicle apparatus 1. Thus, the in-vehicle apparatus 1 can use the terminal device 41 without having the driver information of the terminal device 41 included in the mobile communication terminal 3.

Therefore, according to the in-vehicle apparatus 1, it is possible to prevent a shortage of resources of the in-vehicle apparatus 1. In addition, in the in-vehicle apparatus 1, it is only necessary to hold the information of the connection device that communicates with the mobile communication terminal 3, and each terminal device 41 can be used without having the device driver information of each terminal device 41 in advance. It is possible to expand (improve processing capability) the in-vehicle apparatus 1. By allocating resources of the mobile communication terminal 3 having remarkable performance improvement, the processing capability is improved, and more complicated calculation and drawing can be performed.

In the in-vehicle apparatus 1, the terminal device information 5 includes the type and/or name of the terminal device 41 and the number of the terminal devices 41. In this case, the terminal device information 5 can be specifically configured.

In the in-vehicle apparatus 1, the terminal device information 5 transmitted from the mobile communication terminal 3 is stored in the storage unit 11 when the in-vehicle apparatus 1 and the mobile communication terminal 3 are communicably connected to each other or when the mobile communication terminal 3 communicably connected to the in-vehicle apparatus 1 is powered ON. In this case, the terminal device information 5 can be obtained at a suitable timing.

In the in-vehicle apparatus 1, the terminal device information 5 stored in the storage unit 11 is deleted when the connection between the in-vehicle apparatus 1 and the mobile communication terminal 3 that are communicably connected to each other is released or when the mobile communication terminal 3 that is communicably connected to the in-vehicle apparatus 1 is powered OFF. In this case, the terminal device information 5 can be discarded at a suitable timing.

The in-vehicle apparatus 1 includes an application 13 that executes a drive recorder function of the vehicle. The terminal device information 5 includes information for using the camera 41*a* of the mobile communication terminal 3. When there is a request from the application 13 to the in-vehicle device manager 12 to use the device, a camera use request using the camera 41*a* of the mobile communication terminal 3 is transmitted from the in-vehicle device manager 12 to the mobile communication terminal 3 based on the terminal device information 5. When a camera use request is transmitted from the in-vehicle device manager 12 to the mobile communication terminal 3, the camera 41*a* is activated to acquire video data, and the video data is inputted to the application 13 from the mobile communication terminal 3. This makes it possible to execute the drive recorder function by using the terminal device 41 of the mobile communication terminal 3.

Although the embodiments have been described above, one aspect of the present disclosure is not limited to the above-described embodiments. One aspect of the present disclosure can be implemented in various forms, including the above-described embodiments, in which various changes and modifications are made based on the knowledge of a person skilled in the art.

In the above-described embodiment, a connection device such as an optical connector and a USB connector may be used for connection between the in-vehicle apparatus 1 and the mobile communication terminal 3. For the optical connector, a half mirror, a photonic crystal, or the like can be used. When the in-vehicle apparatus 1 and the mobile communication terminal 3 are communicated by optical wireless communication, the degree of freedom is high and safety is enhanced. Two-way communication is possible between the in-vehicle apparatus 1 and the mobile communication terminal 3. High-speed communication is possible between the in-vehicle apparatus 1 and the mobile communication terminal 3.

In the above embodiment, the application 13 of the in-vehicle apparatus 1 requests confirmation of the connection device of the mobile communication terminal 3. In response to the request, the terminal device information 5 may be transmitted from the mobile communication terminal 3 to the in-vehicle apparatus 1, and the terminal device information 5 may be stored in the storage unit 11. Thus, for example, when the terminal device 41 of the mobile communication terminal 3 is restored after stopping due to some abnormality, the terminal device information 5 can be acquired again.

In the above-described embodiment, the terminal device information 5 stored in the storage unit 11 may be deleted when the application 13 of the in-vehicle apparatus 1 abnormally terminates and the terminal device 41 of the mobile communication terminal 3 used by the application 13 is abnormal or when the application 13 issues a request to disconnect the terminal device 41.

In the above-described embodiment, the terminal device information 5 may include information on the usage status of the terminal device 41 in place of or in addition to at least one of the type, the name, and the number of the terminal devices 41. This eliminates the need to process S4 of FIG. 3. This is because the use status of the terminal device 41 can be updated on the mobile communication terminal 3 side when the specific application 13 operated in the in-vehicle apparatus 1 ends.

What is claimed is:

1. An in-vehicle apparatus to be mounted on a vehicle, the in-vehicle apparatus comprising:

a storage unit configured to store terminal device information for use of a terminal device that is a device of a terminal that establishes a communicative connection to the in-vehicle apparatus;

an in-vehicle device management unit configured to transmit a terminal device use request that is a request to use the terminal device to the terminal based on the terminal device information stored in the storage unit; and a drive recorder execution unit configured to execute a drive recorder function of the vehicle, wherein when the terminal device use request is transmitted from the in-vehicle device management unit to the terminal, data is acquired by the terminal device and is input from the terminal to the in-vehicle apparatus, the terminal device information includes information for use of a camera of the terminal, when the request to use the terminal device is given from the drive recorder execution unit to the in-vehicle device management unit, a camera use request that is the terminal device use request to use the camera of the terminal is transmitted from the in-vehicle device management unit to the terminal based on the terminal device information, and when the camera use request is transmitted from the in-vehicle device management unit to the terminal, the camera is activated to acquire video data and the video data is input from the terminal to the drive recorder execution unit.

2. The in-vehicle apparatus according to claim 1, wherein the terminal device information includes at least one of a type and/or a name of the terminal device, the number of the terminal devices, and a usage status of the terminal device.

3. The in-vehicle apparatus according to claim 1, wherein the terminal device information transmitted from the terminal is stored in the storage unit in at least either of a case where the in-vehicle apparatus and the terminal establish the communicative connection to each other and a case where the terminal that establishes the communicative connection to the in-vehicle apparatus is powered ON.

4. The in-vehicle apparatus according to claim 1, wherein the terminal device information stored in the storage unit is deleted in at least either of a case where the communicative connection between the in-vehicle apparatus and the terminal is terminated and a case where the terminal that establishes the communicative connection to the in-vehicle apparatus is powered OFF.

* * * * *